United States Patent [19]

Wertheim

[11] Patent Number: 4,645,940
[45] Date of Patent: Feb. 24, 1987

[54] INTERRUPT-FREE, UNREGULATED POWER SUPPLY

[75] Inventor: Max M. Wertheim, Huntington, N.Y.

[73] Assignee: Grumman Aerospace Corporation, Bethpage, N.Y.

[21] Appl. No.: 808,725

[22] Filed: Dec. 13, 1985

Related U.S. Application Data

[63] Continuation-in-part of Ser. No. 423,684, Sep. 27, 1982, abandoned.

[51] Int. Cl.⁴ .............................. H02J 1/00; H02J 9/00
[52] U.S. Cl. ........................................ 307/66; 307/67; 307/87; 307/84; 322/29; 322/32
[58] Field of Search ...................... 307/43, 44, 47, 57, 307/58, 60, 64, 65, 66, 67, 68, 73, 74, 75, 76, 77, 78, 79, 80, 84, 85, 86, 87; 290/4 R, 4 A, 4 B, 4 C, 4 D, 1 R; 322/20, 28, 32, 29

[56] References Cited

U.S. PATENT DOCUMENTS

| | | | |
|---|---|---|---|
| 2,636,132 | 4/1953 | Stineman et al. | 307/57 |
| 2,872,591 | 2/1959 | Stineman | 290/4 A |
| 3,665,495 | 5/1972 | Carter et al. | 307/67 |
| 3,823,327 | 7/1974 | Bayer | 307/58 |
| 4,069,424 | 1/1978 | Burkett | 307/87 |
| 4,074,180 | 2/1978 | Sharpe et al. | 307/84 X |
| 4,087,698 | 5/1978 | Myers | 322/32 X |
| 4,136,286 | 1/1979 | O'Halloran et al. | 307/47 X |
| 4,195,233 | 3/1980 | Lakos | 307/66 |
| 4,203,041 | 5/1980 | Sachs | 307/67 |
| 4,275,311 | 6/1981 | Agazzone et al. | 307/86 X |
| 4,321,645 | 3/1982 | Thom et al. | 361/87 X |
| 4,328,429 | 5/1982 | Kublick | 307/58 |
| 4,349,744 | 9/1982 | Reuther et al. | 307/87 X |
| 4,400,626 | 8/1983 | Lacy | 307/66 |
| 4,465,943 | 8/1984 | Risberg | 307/67 |
| 4,471,233 | 9/1984 | Roberts | 307/66 |

Primary Examiner—William M. Shoop, Jr.
Assistant Examiner—Shik Luen Paul Ip
Attorney, Agent, or Firm—Richard G. Geib; Daniel Jay Tick; Bernard S. Hoffman

[57] ABSTRACT

A primary and at least one backup alternating voltage source are coupled to a common load to provide interrupt free electric current to the load through a simplified interconnecting network. Phase control of all but one of the sources is accomplished by monitoring the phase difference across choke coils coupling the sources to the load.

4 Claims, 6 Drawing Figures

INTERRUPT-FREE, UNREGULATED POWER SUPPLY

BACKGROUND OF THE INVENTION

This is a continuation-in-part of application, Ser. No. 423,684, filed Sept. 27, 1982 for Interrupt-Free, Unregulated Power Supply, now abandoned.

The present invention relates to interrupt-free electric power supplies. More particularly, the invention relates to a simple means for coupling several sources to a common load to achieve uninterruptibility of the power supply.

U.S. Pat. No. 4,010,381, issued to Fickenscher et al, discloses an uninterruptible power supply which delivers a regulated output by utilizing a ferroresonant transformer. In many applications, however, regulation of the supply output is unnecessary, as in systems where the device constituting the load include independent regulation means. This is particularly true of aircraft, submersible and aerospace power supply systems. Thus, the added weight penalty of a ferroresonant device makes the Fickenscher et al power supply unsuitable to such applications.

A further shortcoming of the Fickenscher et al system relates to the high weight and volume penalty associated with the requisite full-power battery-energized backup power source described therein.

In view of the deficiencies in the Fickenscher et at system and the shortcomings of other prior art systems detailed therein, it would be highly desirable to provide an interrupt-free power supply which overcomes these problems.

The primary object of the invention is to provide an interrupt-free power supply which is unencumbered by a ferroresonant transformer.

An object of the invention is to provide an interrupt-free power supply suitable for such applications as aircraft, submersibles and aerospace vehicles, where space and weight are strictly limited and regulation is unnecessary.

Another object of the invention is to provide a power supply capable of utilizing a multiplicity of rotary powered electrical sources, and a partial powercapable battery-energized static inverter backup safety source as well.

Still another object of the invention is to provide an interrupt-free power supply in which either one source at a time will carry the full load, or in which several sources will share the required load power in accordance with a predetermined scheme.

Yet another object of the invention is to provide an interrupt-free power supply having high reliability, low maintenance costs, and minimum weight and volume penalties.

BRIEF SUMMARY OF THE INVENTION

These and other objects and advantages are realized in the invention by provision of a simplified scheme for coupling two or more alternating voltage sources to a common load. In a preferred embodiment, the sources are primarily salient-pole synchronous alternators, with a safety backup as hereinafter described by means of a battery-energized static inverter, each having its output terminal coupled to the load by means of an inductor or choke. Each choke has an associated phase comparator circuit which senses the phase difference between the load voltage and that at the output terminal of each source to provide a phase control feedback signal used, in turn, to control the phase of that source. If the phase of all but one source is constrained to be zero with respect to that of the load, only the one source not so constrained will deliver load current in proportion to the sine of the phase angle between its output terminal and the load. A failure of such an active source is sensed as a decrease in its output terminal voltage below a predetermined threshold, and triggers assertion of a source failure signal. Appropriate control is implemented to provide for activation of one or more alternate sources by removal of phase constraints and setting of desired phase levels in desired sequence. This control is inherently fast enough to prevent the load voltage from decreasing below a desired value.

If the phases of several sources are simultaneously controlled to other than zero with respect to that of the load, the power delivered to the load from each will be proportional to the sine of each such angle (equation (4)). Failure of any one source then resets each remaining source's phase angle to maintain full load capability. Such a scheme is used to provide load-sharing among less than fully power-capable source, where necessary, or among full capability sources, where desired for other reasons.

In accordance with the invention, an interrupt-free power supply comprises at least two AC voltage sources of equal frequency, each having a set of output terminals. At least one terminal of each voltage source is grounded. Each of a number of inductors equal to the number of AC voltage sources couples the ungrounded output terminal of a corresponding one of the AC voltage sources to a common load, whereby the power delivered to the common load by each AC voltage source is related to a voltage phase angle across its associated inductor. Each of a number of feedback circuits equal to the number of AC voltage sources, includes phase comparator means for sensing the phase difference between the load voltage and the voltage at the ungrounded output terminal of each of the AC voltage sources to provide a phase control feedback signal for controlling the phase of the associated AC voltage source, whereby if the phase of all but one of the AC voltage sources is constrained to zero with respect to that of the load, only the one of the AC voltage sources not so constrained delivers load current in proportion to the sine of the phase angle between the ungrounded output terminal of the one of the AC voltage sources and the load. A safety backup comprises a battery-energized static inverter having a set of output terminals, at least one of which is grounded. An additional feedback circuit includes a phase comparator for sensing the phase difference between the load voltage and the voltage at the ungrounded output terminal of the static inverter to provide a phase control feedback signal for controlling the phase of the static inverter. The additional feedback circuit is connected in common with the number of feedback circuits. An additional inductor couples the output terminal of the static inverter to the load, whereby upon failure of all the AC voltage sources, the static inverter supplies a reduced load.

Each of the feedback circuits comprises means generating a source failure signal indicating whether the output voltage amplitude of its AC voltage source is below a predetermined threshold, the means including a voltage comparator having one input responsive to a signal proportional to the output voltage amplitude of the AC voltage source and another input responsive to a signal proportional to the predetermined threshold.

In accordance with the invention, an uninterruptible power supply comprises first, second and third salient-pole, synchronous alternators of equal frequency, each of the alternators having a set of output terminals, one of which is grounded. Each of first, second and third inductors connects the ungrounded output terminal of a corresponding one of the alternators to a common electrical load. Each of first, second and third voltage phase comparators has inputs connected to either side of an associated one of the inductors. Each of the voltage phase comparators outputs a voltage phase signal proportional to a voltage phase angle across its associated inductor. Each of first, second and third voltage comparator means, responsive to the first, second and third alternators, respectively, outputs a feedback signal indicating whether an output amplitude of the associated alternator has fallen below a predetermined threshold. Logic means generates a second source cutout signal and a second source failure signal in response to the outputs of the first and second voltage comparator means. The second source cutout signal indicates when the output amplitudes of both the first and second alternators are, respectively, below and above the predetermined threshold, the second source failure signal indicating when the output amplitudes of both of the first and second alternators are below the predetermined threshold. First, second and third coupling means couple, respectively, the first, second and third alternators to prime movers, each of the coupling means being responsive to the like numbered feedback signal such that a shaft speed of the associated alternator is adjusted in a transient manner until the like numbered feedback signal reverts to a level associated with the desired voltage phase angle. A static inverter has a set of output terminals, one of which is grounded. An additional inductor is provided. An additional voltage phase comparator has an input connected to either side of the additional inductor. The additional voltage phase comparator outputs a voltage phase signal proportional to a voltage phase angle across the additional inductor and proportional to the voltage at the ungrounded output terminal of the inverter for controlling the phase of the inverter. The additional voltage phase comparator is connected in common with the first, second and third voltage phase comparators, the ungrounded output terminal of the inverter being coupled to the load via the additional inductor, whereby upon failure of all the alternators, the inverter supplies the reduced load.

In accordance with the invention, an uninterruptible power supply comprises n salient-pole, synchronous alternators of equal frequency, wherein n is a whole integer equal to at least two, each of the alternators having a set of output terminals, one of which is grounded. Each of n inductors connects the ungrounded output terminal of a corresponding one of the alternators to a common electrical load. Each of n voltage phase comparators has inputs connected to either side of an associated one of the inductors. Each of the voltage phase comparators outputs a voltage phase signal proportional to a voltage phase angle across its associated inductor. Each of the n voltage comparator means, responsive to n alternators, respectively, outputs a feedback signal indicating whether an output amplitude of the associated alternator has fallen below a predetermined threshold. Logic means generates a second source cutout signal and a second source failure signal in response to the outputs of the first and second voltage phase comparators. The second source cutout signal indicates when the output amplitudes of the first and second alternators are, respectively, below and above the predetermined threshold, the second source failure signal indicating when the output amplitudes of both the first and second alternators are below the predetermined threshold. Each of n coupling means couples, respectively, the alternators to prime movers. Each of the coupling means is responsive to the like-numbered feedback signal such that a shaft speed of the associated alternator is adjusted in a transient manner until the like-numbered feedback signal reverts to a level associated with the desired voltage phase angle. A static inverter has a set of output terminals, one of which is grounded. An additional inductor is provided. An additional voltage phase comparator has an input connected to either side of the additional inductor. The additional voltage phase comparator outputs a voltage phase signal proportional to a voltage phase angle across the additional inductor and proportional to the voltage at the ungrounded output terminal of the inverter for controlling the phase of the inverter. The additional voltage phase comparator is connected in common with the n voltage phase comparators, the ungrounded output terminal of the inverter being coupled to the load via the additional inductor, whereby upon failure of all the alternators, the inverter supplies the reduced load.

The invention is especially suitable for aerospace environments. Thus, for example, one or more sources may utilize a mechanically coupled power takeoff from one or more aircraft engines. Other partial-power backup sources may use a battery-energized static inverter. Phase control of the rotary-powered sources may then be asserted by transient control of generator speed, while that for the static inverter may be direct phase shift of the drive signals.

The partial-power static inverter may be coupled to a reduced safety-essential load to provide only enough electrical power to permit safe landing of the vehicle. This principle of load-shedding is presently used in non-interruptible and other systems. In fact, for crew safety, it is also used in submersibles to provide sufficient power to allow surfacing safely.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
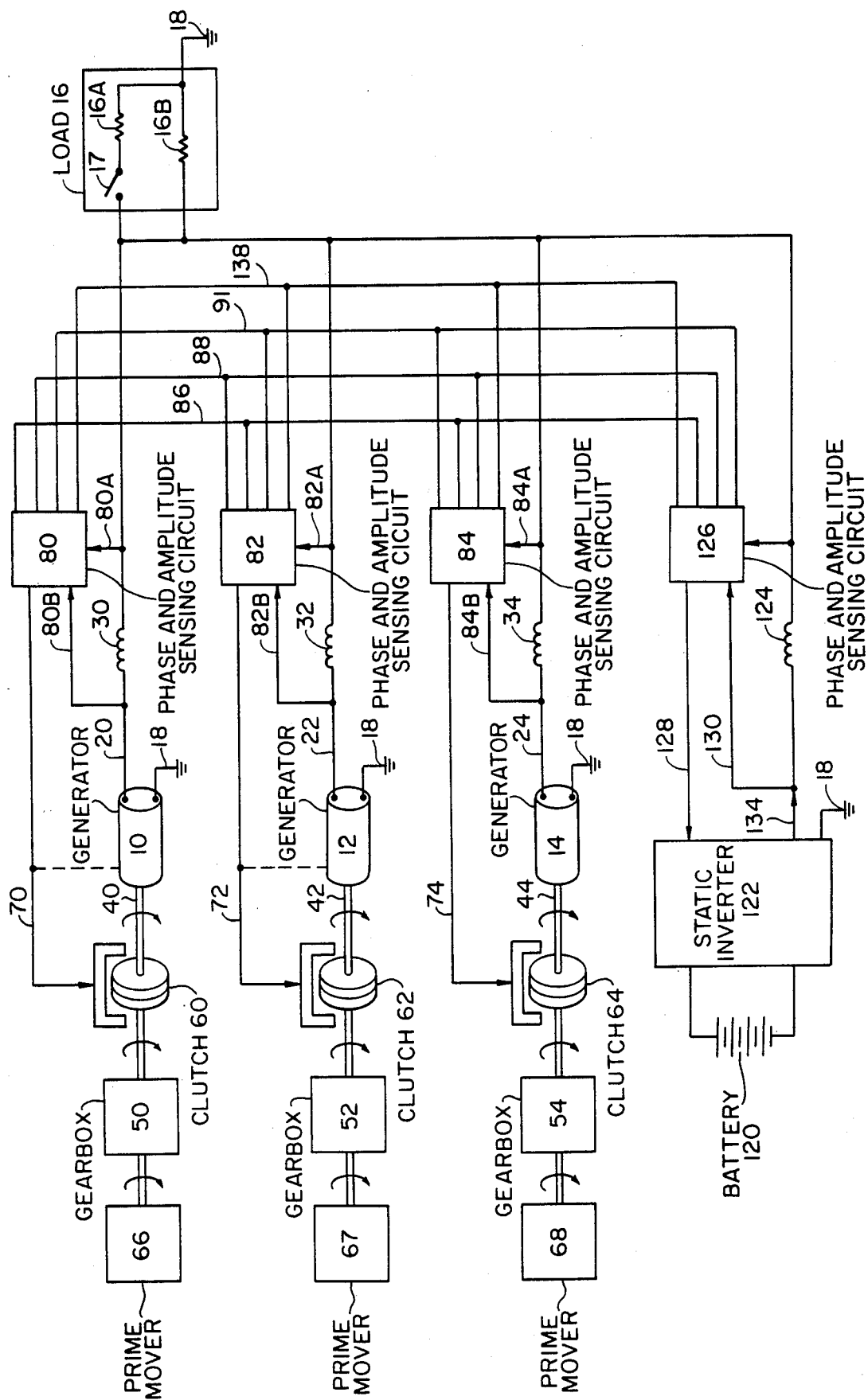
FIG. 1 is a schematic diagram of an embodiment of the interrupt-free, unregulated power supply of the invention.

In the embodiment of FIG. 1 of the invention, three independent electric generators 10, 12 and 14 and one static inverter 122 are arranged to deliver power to a common load 16. Load 16 consists of two parts. These are the non-safety-essential load 16A, and the safety essential load 16B.

The load 16A is controlled by a load-shedding switch 17. As shown in FIG. 1, the sources and the load share a common ground 18. Modern power systems contain distribution control logic permitting the non-safety-essential load 16A to be shed in whole or in part in an emergency. This logic operates normally closed switch 17, which may, in fact, be several switches operating at the same time or in sequence, thus shedding the load 16A, but retaining power from the emergency source on the safety-essential load 16B only. This distribution control logic is not part of the invention, but is included for illustrative purposes only. Electric output terminals 20, 22 and 24 of the generators 10, 12 and 14, respectively, are coupled to the load 16 via chokes 30, 32 and 34, respectively. The output terminal 134 of the emergency source inverter 122 is similarly coupled to the load 16 via a choke 124. Single phase is shown for simplicity, but it is obvious to those skilled in the art that two-phase or three-phase, or other multiphase arrangements may be used without departing from the intent of the invention.

For the rotary machines, mechanical power is delivered to the generators 10, 12 and 14 by mechanical input shafts 40, 42 and 44, respectively, coupled, in turn, to gearboxes 50, 52 and 54, respectively, via clutches 60, 62 and 64, respectively. Prime movers 66, 67 and 68 may be power takeoffs from aircraft engines, or ram air turbines, or any other type of rotary power source device.

Preferably, the gearboxes and clutches are designed to permit generator speed control on a transient basis, as by phase control 70, 72 and 74 input to the clutches 60, 62 and 64, respectively. Those skilled in the art will appreciate that such control can be realized by various well-known means such as a hydraulically coupled gearbox with a fluid clutch, or an eddy current clutch having a magnet coil in one of the plates. These and other known control means may be used without departing from the spirit of the invention.

Phase control signals 70, 72 and 74 are derived from phase and amplitudes sensing circuits 80, 82 and 84, respectively. Absence of any of the phase control signals 70, 72 or 74 effectively disconnects the associated generator from the load 16. Each of the circuits 80, 82 and 84, in turn, has one input 80A, 82A and 84A, respectively, connected to the load 16 and another input 80B, 82B and 84B, respectively, connected to the output of the associated generator. In addition, the circuits 80, 82, 84 and 126 provide source failure signals 86, 88, 91 and 138 to the other circuits, such that all the circuits are signaled when a failure occurs.

Figure 2A:
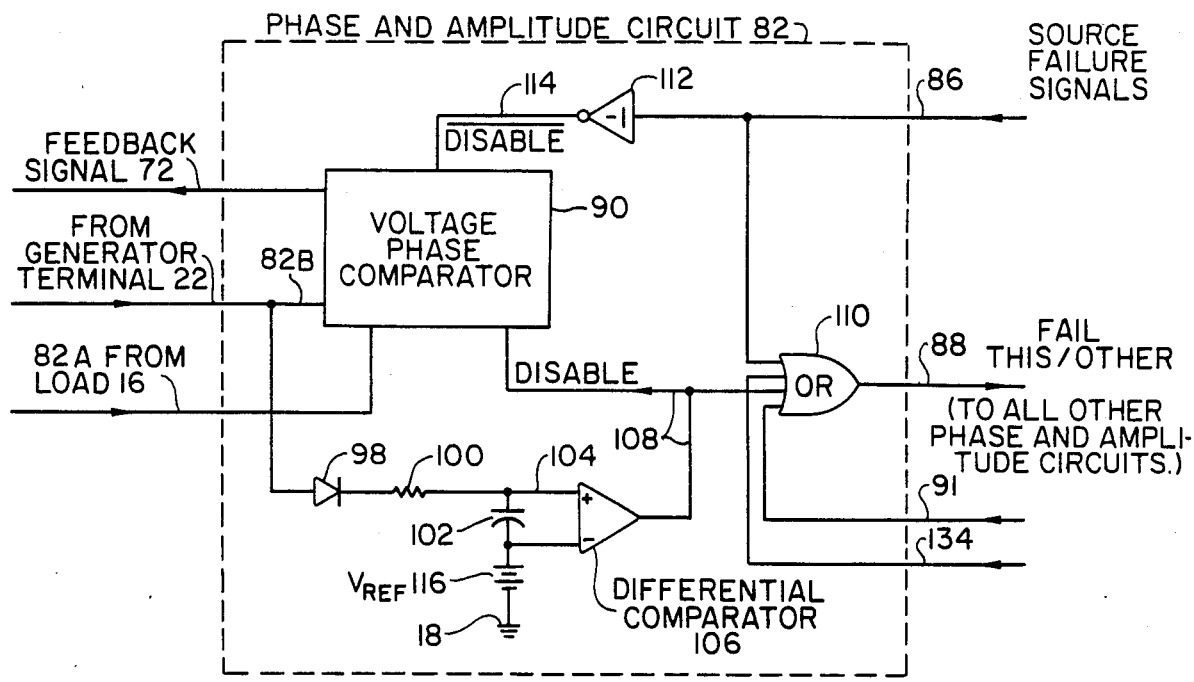
FIGS. 2a, b, c and d are circuit diagrams showing in greater detail portions of FIG. 1.
Figure 2B:
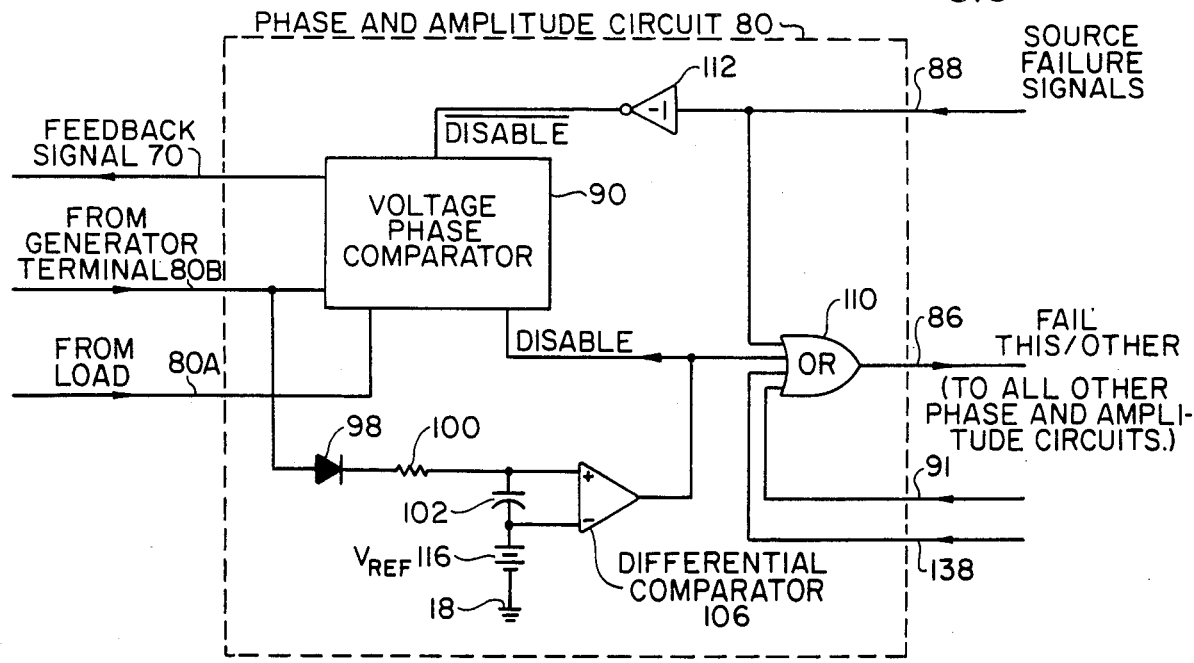
Figure 2C:
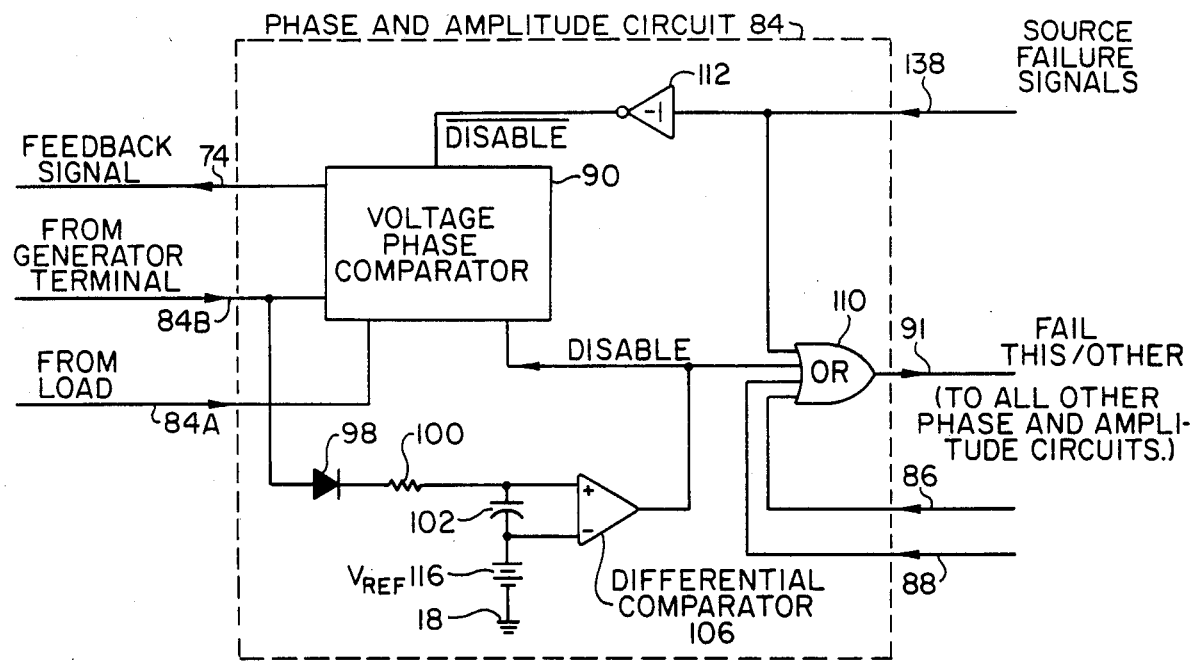
Figure 2D:
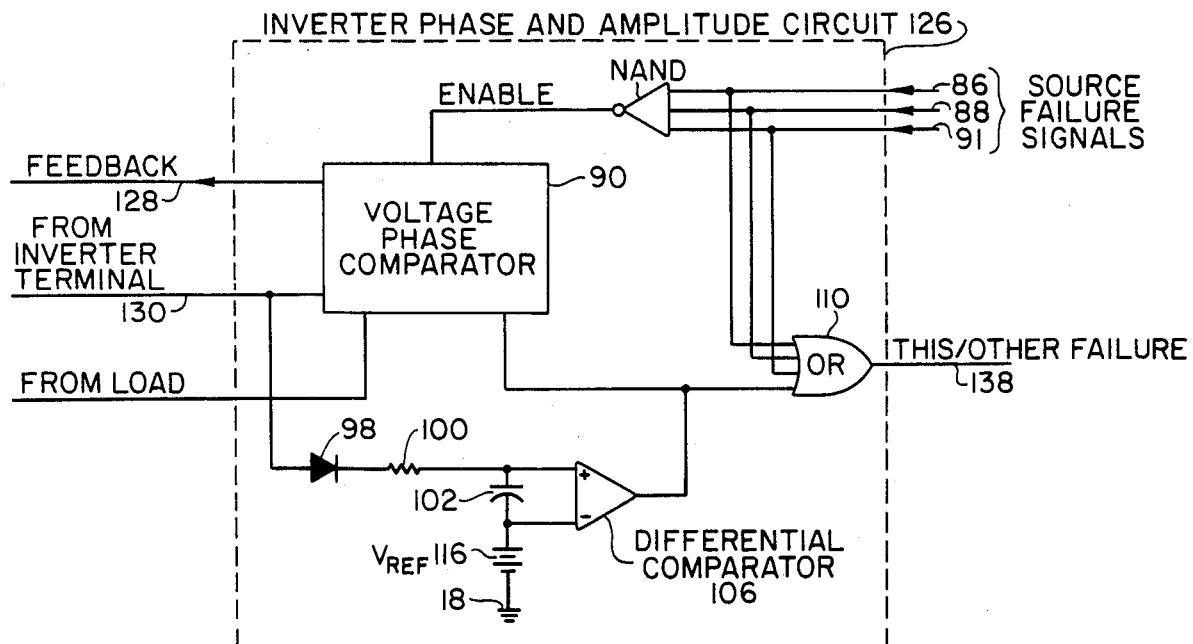

In the event of failure of all the rotary-powered sources, the emergency static inverter 122 would supply the safety-essential load 16B by activation of the failure signal 138 through the circuit 126. The inverter 122 output is then phase-shifted off zero with respect to the load 16B in order to pick it up. The circuit 126 is identical to the phase and amplitude sensing circuits 80, 82 and 84, except for the following (FIGS. 2a to 2d). The signal inverter 112 of FIG. 2a is replaced by a NAND gate, as shown in FIG. 2d whose output is true when all other sources have failed and feedback signal 128 is tailored to the requirements of the static inverter 122.

During normal operation, when there are no failures, or failures within the capacity of the system, a battery 120 is maintained charged either by a separate battery charger, or by having the static inverter 122 designed for bidirectional power flow, permitting it to charge the battery. In any event, the static inverter 22 would at least be kept "idling" in synchronism with the system frequency, for the same reason that generators are kept generating voltage, even when not supplying load.

FIG. 2a shows an exemplary circuit of the phase and amplitude circuit of sensor 82. A voltage phase comparator 90, having the input 82B from the generator terminal 22, and the input 82A connected to the load 16, outputs a voltage phase signal 72 proportional to the phase angle across the associated inductor 32. The input signal 82B is also rectified through a diode 98, a resistor 100 and a filter capacitor 102 to produce an averaged DC signal 104 proportional to the voltage value at the terminal 22. A differential comparator 106, responsive to the signal 104, and to a DC reference voltage $V_{REF}$, provided by a battery 116, and representing a predetermined threshold below which a failure of the generator 12 is determined to have occurred, outputs a logic signal 108 indicating such failure.

Those skilled in the art will recognize that the DC signal 104 can be derived from the voltage level of the terminal 22 as an RMS-responsive value rather than as an average-responsive value, as shown herein, without departing from the spirit of the invention. In turn, the signal 108 is combined, as by a multiple input OR gate 110, with all other source failure signals 86, 91 and 134 from the other source to derive a source failure signal 88. All source failure signals are so combined for each remaining source. The signal 108 is also fed to internal logic in the voltage phase comparator 90, along with the source failure signal 86, as inverted via a logic inverter 112, to become a signal 114. This logic is such that when the signal 108 is "true," and the signal 114 is "false," the action of the voltage phase comparator 90 is disabled. The feedback signal then no longer exists to be fed to clutch 42. This absence of a driving signal to the clutch 42 permits the clutch to decouple the rotary power of the gearbox 52 from the driving generator 12. Thus, no voltage is generated by the generator 12 and it is disconnected from the load 16. Since, while the aforedescribed action is occurring the other rotary sources are also being signaled by signals 86, 91 and 138, the system operation rules will clearly cause these other sources to pick up the load power previously supplied by the generator 12. Such action can occur either preferentially, one at a time, or by altering the choke phase angles, change the load share of each.

A circuit similar to that of FIG. 2a may be used as each of the phase and amplitude sensors 80, 84 and 126, except as herein described, as well. Schematics of these are shown in FIGS. 2b, 2c and 2d. In operation, the power delivered to the load 16 by each source is a function of the phase angle of the generator output terminal voltage with respect to that of the load voltage. This functional relationship may be more clearly understood with reference to FIG. 3, which shows the equivalent circuit of the generator 10, choke 30 and load 16. Since the generators 12 and 14, and the static inverter 122 are connected to the load 16 in a manner identical to that of the generator 10, it will be understood that the description of FIG. 3 may be readily applied to all the source outputs.

Figure 3:
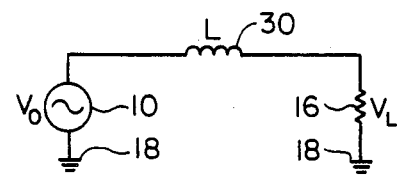
FIG. 3 is an equivalent circuit diagram of the source-to-load coupling for one of the sources of FIG. 1.

Referring to FIG. 3, the generator 10 is represented as an alternating voltage source whose output is:

$$V_o = E_o \cos(\omega t + \beta_o) \tag{1}$$

where $E_o$ is the peak output amplitude of the generator 10, $\omega$ is the radian frequency of the system, and $\beta_o$ is, by definition, the phase angle of the generator output voltage with respect to that of the load. The voltage of the load 16 is:

$$V_L = V \cos(\omega t) \qquad (2)$$

where V is the peak load voltage amplitude. Thus, the current $I_o$ delivered to the load 16 by the generator 10, that is, the current through the inductor 30, is given by:

$$I_o = (1/\omega L)[V \cos(\omega t) - E_o \cos(\omega t + \beta_o)] \qquad (3)$$

and the apparent power, $P_o$, from the generator 10 is, multiplying equation (1) by equation (3):

$$P_o = \left[\frac{E_o V}{2\omega L}\right] \sin \beta_o. \qquad (4)$$

From the foregoing, it is clear that the phase angle $\beta_o$ of each source with respect to the load 16 may vary from zero (0), signifying that no power is being delivered from a particular source, to some characteristic value of the system design $\beta_{max}$, at which the source is delivering all the power available. Trial calculations show that $\beta_{max}$ rarely needs to be over 5° for systems up to about 250 KW. That signifies that system efficiency is excellent, and failure response speed within a fraction of a cycle is realizable. By sensing the phase angle for the generators 10, 12 and 14, and the static inverter 122, the phase and amplitude sensing circuits 80, 82, 84 and 126 are able to provide feedback signals 70, 72, 74 and 128, respectively, to control generator speed on a transient basis and inverter phase directly, and hence to control the power supplied by each.

The phase control feedback signals will then be proportional to the angle across the associated choke unless the source fails. In turn, the clutch coupling of each clutch 60, 62 and 64, and the phase of the static inverter 122, are each varied according to each associated feedback signal. The generator phase angles are thereby adjusted; that is, transient speed retardation, then recovery to increase the phase angle, and/or transient speed advance, then recovery to decrease the phase angle, until the feedback signal reverts to equilibrium, a level indicating that the desired phase angle has been attained.

In a preferred embodiment of the invention, salient-pole synchronous alternators are used as the generators 10, 12 and 14. This embodiment also includes the battery 120 and the static inverter 122 as the emergency source. Preferably, the static inverter 122 is designed for bidirectional power flow to enhance system reliability and maintainability. As hereinbefore stated, the AC-to-DC power flow direction is then used to maintain the battery 120 charged. Those skilled in the art will recognize that this type of inverter design is accomplished primarily by adjusting the phase angle of the inverter terminal voltage to lag that of the load by a few degrees. Power will then flow into the inverter and the battery through the choke 124 from the active rotary sources. Such a design is used for illustrative purposes here, and is not part of the present invention.

In the embodiment of FIG. 1, then, either preferential one at a time operation or load sharing operation is possible, depending upon specific design requirements. Thus, for example, the generator 10 may serve as the primary source, and, under normal circumstances, the signals 72, 74 and 128 will constrain the generators 12 and 14, and the static inverter 122 to operate in phase with the load 16, supplying no power. Any failure along or within the generator 10, clutch 60, gearbox 50 or prime mover 66, manifesting itself as a decrease of output voltage level below threshold at the terminal 20, will be detected by the phase and amplitude sensing circuit 80. The phase and amplitude sensing circuit 80 will thereupon simultaneously cause the generator 10 to cease generating by decoupling the clutch 60, and will cause the phase and amplitude sensing circuit 82 to assert the necessary phase angle difference signal to cause the generator 12 to carry the load. Subsequent failures will cause the load to be similarly transferred to the generator 14 and/or the static inverter 122, as required. It is clear to those skilled in the art that these events can be preprogrammed to occur by storage in a computing means. Such means can store the necessary sequential data, phase angle information, and any other intelligence required. The computing means may also issue the necessary commands and, using prestored algorithms, be involved in the active control. Although not a part of the present invention, all this may be designed in without departing from the spirit and intent thereof.

Load sharing may be accomplished by having the generators 10 and 12 phase angles preset to permit each to carry a specified fraction of the load. Failure of one may then cause either the remaining unit to carry full load until a subsequent failure, or the generator 14 to pick up a predetermined share of the load. In the former case the generator 14 would pick up the load in the same preferential manner as before. In the latter case, subsequent failures might cause the static inverter 122 to carry part of the load.

Those skilled in the art will appreciate that the feedback signals may additionally be used for coarse voltage control of the sources by supplying DC excitation voltages indicated by the dashed lines in FIG. 1. If the load possesses a sufficiently large energy storage capacity, a system could be designed using only such voltage control, without the clutch-coupled speed control for the rotary sources.

Obviously, various other modifications may be made within the present inventive concept. In general, any sources susceptible of output voltage phase control may be utilized. It should be further appreciated that the invention is not limited to aerospace or similar applications, but may be used advantageously wherever interrupt-free electric power is needed, but load voltage regulation is either not required or is provided by independent means. The number of sources and prime movers is a matter of design choice, of course.

In view of the numerous possible embodiments which will suggest themselves to those skilled in the art, the foregoing descriptions are presented by way of example only. The scope of the present invention is limited only by the claims which follow.

I claim:

1. An interrupt-free power supply comprising
    at least two AC voltage sources of equal frequency, each having a set of output terminals, at least one of the terminals being grounded;
    a number of inductors equal to the number of AC voltage sources, each coupling the ungrounded output terminal of a corresponding one of said AC voltage sources to a common load, whereby the power delivered to the common load by each of said AC voltage sources is related to a voltage phase angle across its associated inductor;

a number of feedback circuit means equal to the number of AC voltage sources, each of said feedback circuit means including phase comparator means for sensing the phase difference between the load voltage and the voltage at the ungrounded output terminal of each of said AC voltage sources to provide a phase control feedback signal for controlling the phase of the associated AC voltage source, whereby if the phase of all of said AC voltage sources, with the exception of one of said AC voltage sources, is constrained to zero with respect to that of said load, only said one of said AC voltage sources not so constrained delivers load current in proportion to a sine of the phase angle between the output terminal of said one of said AC voltage sources and said load;

safety backup means comprising a battery-energized static inverter having a set of output terminals, at least one of the terminals being grounded;

additional feedback circuit means including phase comparator means for sensing the phase difference between the load voltage and the voltage at the ungrounded output terminal of said static inverter to provide a phase control feedback signal for controlling the phase of said static inverter, said additional feedback circuit means being connected in common with said number of feedback circuit means; and an additional inductor coupling the output terminal of said static inverter to said load, whereby upon failure of all said AC voltage sources, said static inverter supplies a reduced load.

2. An interrupt-free power supply as claimed in claim 1, wherein each of said feedback circuit means comprises means generating a source failure signal indicating whether an output voltage amplitude of its AC voltage source is below a predetermined threshold, said means including a voltage comparator having one input responsive to a signal proportional to the output voltage amplitude of said AC voltage source and another input responsive to a signal proportional to the predetermined threshold.

3. An uninterruptible power supply, comprising
first, second and third salient-pole, synchronous alternators of equal frequency, each of said alternators having a set of output terminals, one of which is grounded;
first, second and third inductors, each connecting the ungrounded output terminal of a corresponding one of said alternators to a common electrical load;
first, second and third voltage phase comparators, each having inputs connected to either side of an associated one of said inductors, each of said voltage phase comparators outputting a voltage phase signal proportional to a voltage phase angle across its associated inductor;
first, second and third voltage comparator means, responsive to said first, second and third alternators, respectively, each outputting a feedback signal indicating whether an output amplitude of the associated alternator has fallen below a predetermined threshold;
logic means generating a source cutout signal and a source failure signal in response to the outputs of said first and second voltage comparator means, the source cutout signal indicating when the output amplitudes of both said first and second alternators are, respectively, below and above said predetermined threshold, said source failure signal indicating when the output amplitudes of both of said first and second alternators are below said predetermined threshold;
first, second and third coupling means coupling, respectively, said first, second and third alternators to prime movers, each of said coupling means being responsive to the like-numbered feedback signal such that a shaft speed of the associated alternator is adjusted in a transient manner until the like-numbered feedback signal reverts to a level associated with the desired voltage phase angle;
static inverter means having a set of output terminals, one of which is grounded:
an additional inductor; and
an additional voltage phase comparator having an input connected to either side of said additional inductor, said additional voltage phase comparator outputting a voltage phase signal proportional to a voltage phase angle across said additional inductor and proportional to the voltage at the ungrounded output terminal of said inverter for controlling the phase of said inverter, said additional voltage phase comparator being connected in common with said first, second and third voltage phase comparators, the output ungrounded terminal of said inverter being coupled to said load via said additional inductor, whereby upon failure of all said alternators, said inverter supplies said reduced load.

4. An uninterruptible power supply, comprising
n salient-pole, synchronous alternators of equal frequency, wherein n is a whole integer equal to at least two, each of said alternators having a set of output terminals, one of which is grounded;
n inductors, each connecting the ungrounded output terminal of a corresponding one of said alternators to a common electrical load:
n voltage phase comparators, each having inputs connected to either side of an associated one of said inductors, each of said voltage phase comparators outputting a voltage phase signal proportional to a voltage phase angle across its associated inductor, each of said n voltage comparator means, responsive to said n alternators, respectively, each outputting a feedback signal indicating whether an output amplitude of the associated alternator has fallen below a predetermined threshold;
logic means generating a source cutout signal and a source failure signal in response to the outputs of said first and second voltage phase comparators, said source cutout signal indicating when the output amplitudes of said first and second alternators are, respectively, below and above said predetermined threshold, said source failure signal indicating when the output amplitudes of both said first and second alternators are below said predetermined threshold;
n coupling means coupling, respectively, said alternators to prime movers, each of said coupling means being responsive to the like-numbered feedback signal such that a shaft speed of the associated alternator is adjusted in a transient manner until the like-numbered feedback signal reverts to a level associated with the desired voltage phase angle;

a static inverter having a set of output terminals, one of which is grounded;

an additional inductor; and an additional voltage phase comparator having an input connected to either side of said additional inductor, said additional voltage phase comparator outputting a voltage phase signal proportional to a voltage phase angle across said additional inductor and proportional to the voltage at the ungrounded output terminal of said inverter for controlling the phase of said inverter, said additional voltage phase comparator being connected in common with said n voltage phase comparators, the ungrounded output terminal of said inverter being coupled to said load via said additional inductor, whereby upon failure of all said alternators, said inverter supplies the reduced load.

* * * * *